Patented Oct. 27, 1953

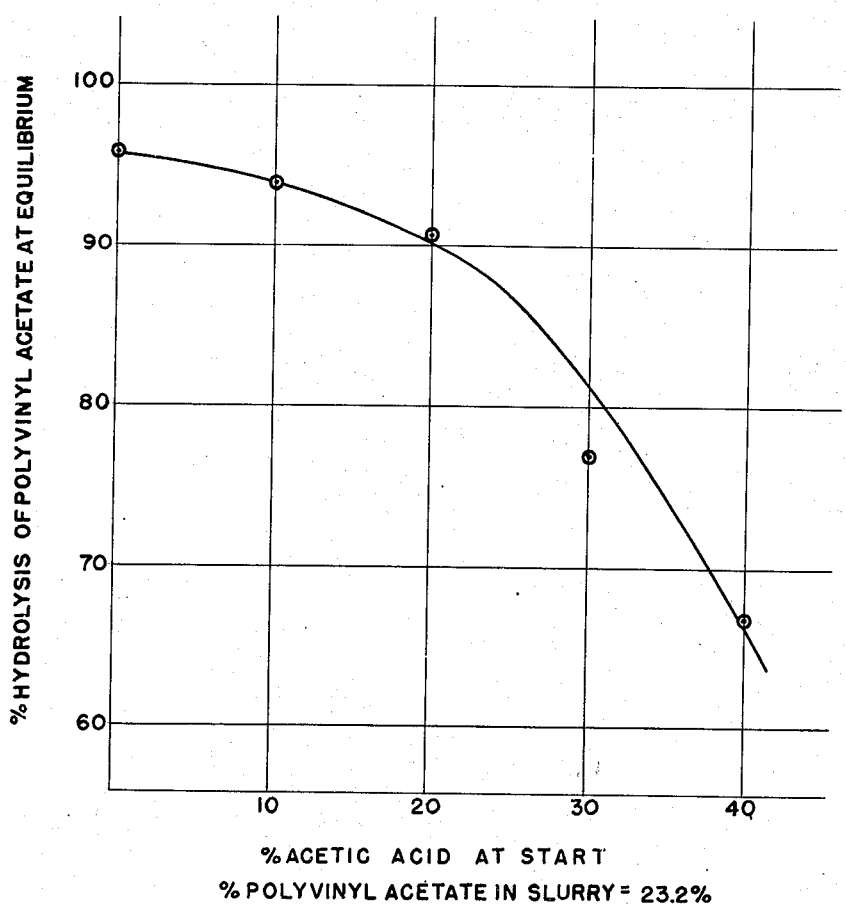
*INVENTOR:*
*Richard Wilson Nebel*
BY
*ATTORNEY*

2,657,201

UNITED STATES PATENT OFFICE 2,657,201

CONTROLLED, HETEROGENEOUS HYDROLYSIS OF POLYMERIC ESTERS

Richard Wilson Nebel, Waynesboro, Va., assignor to E. I. du Pont de Nemours and Company, Wilmington, Del., a corporation of Delaware Application November 25, 1949, Serial No. 129,220

5 Claims. (Cl. 260—91.3)

This invention relates to a method of controlling the heterogeneous, acidic hydrolysis of water-insoluble esters of the polyvinyl type. More particularly, it relates to the controlled heterogeneous hydrolysis of polyvinyl acetate.

It is known that by the partial hydrolysis of polymeric vinyl esters it is possible to obtain valuable polyvinyl compounds having both hydroxyl and ester groups. The usual method, such as that described in U. S. Patent 2,037,012, requires complete dissolution of the polyvinyl ester in aqueous acetic acid, using sulfuric acid as the catalyst and allowing the solution to stand until hydrolyzed to a substantial degree. Although this homogeneous reaction proceeds smoothly, it necessitates using a large quantity of acid solvent to insure complete homogeneity, and the degree of hydrolysis obtained, being no more than about 65%, is lower than frequently desired. The partial hydrolysis of a polymeric vinyl ester is also effected by alkaline or acid alcoholysis. The economic recovery of the excess alcohol and other solvents used in or produced by the reaction has proved troublesome. Further, the principal disadvantage of this procedure lies in the fact that a uniform product is not obtained. Not only are there polymers of different degrees of hydrolysis within the same batch of product, but the partially hydrolyzed polyvinyl esters may be contaminated with salt. As a result, the solubility characteristics of these partially hydrolyzed products are poor.

As far as is known, no completely satisfactory method has heretofore been proposed for preparing hydrolysis products of polyvinyl esters wherein the degree of hydrolysis of the product can be readily and precisely controlled to give uniform products of desired water-solubility and viscosity with ease of reproducibility in minimum time with small quantities of catalyst and in the absence of solvents. This is indeed a desideratum sought after in the polyvinyl alcohol field. It has now been found that by modifying the heterogeneous procedure in the co-pending application of M. T. Goebel, Serial No. 742,466, filed April 18, 1947, now Patent No. 2,629,713, as hereinafter explained rapid hydrolyses of undissolved polyvinyl esters are economically feasible and the degree of hydrolysis is easily and conveniently regulated.

It is an object of this invention to provide an improved method for partially hydrolyzing water-insoluble polyvinyl esters whereby the above-mentioned difficulties are avoided. A further object is the provision of a process for the heterogeneous, acidic hydrolysis of water-insoluble polyvinyl esters, such as polyvinyl acetate, in an aqueous medium containing a surface active catalyst wherein the degree of hydrolysis of the product can be readily and precisely controlled. A still further object is to provide an improved process whereby polymerized vinyl esters of any viscosity can be converted to products having degrees of hydrolysis and water-solubility as desired according to the uses to which the product is to be put. Other objects and advantages will appear hereinafter.

The objects are accomplished by the following invention in which water-insoluble polyvinyl esters are hydrolyzed heterogeneously by heating them in a slurry in an undissolved form in an aqueous medium containing besides a strong acid, such as a sulfonic, phosphinic, phosphonic, or an alkyl phosphoric acid ester, an organic acid in a calculated quantity supplemental to that which is formed by the hydrolysis of the polyvinyl ester, the hydrolysis ceasing when the desired degree of hydrolysis is reached.

The amount of organic acid added is determined empirically. Since an equilibrium reaction is involved, the degree of hydrolysis depends upon the final concentration of organic acid in the medium. By initially adding a predetermined amount of acid the final concentration of organic acid is controlled and the degree of hydrolysis which is dependent upon this concentration is accurately controlled.

In order to accomplish the desired partial hydrolysis, the sulfonic, phosphinic acids, phosphonic, or the alkyl phosphoric acid ester must be appreciably soluble in the polymeric ester being hydrolyzed. The solubility of these compounds in polymeric esters is fully discussed in the copending applications of Goebel, Serial No. 742,466, and Blume, Serial No. 772,457, now Patent No. 2,583,991. Sulfonic, phosphinic and phosphonic acids containing at least five carbon atoms in an alkyl chain or in an aromatic group meet the requirements. Satisfactory results are obtained using alkyl phosphoric acid esters in which the alkyl groups contain from 3 to 10 carbon atoms. Moreover, the quantity of organic acid, preferably a water-soluble lower carboxylic acid, added for proper control of the heterogeneous hydrolysis must obviously be less than that required for solution of the unhydrolyzed polyvinyl ester. For example, high-viscosity polyvinyl acetate will dissolve in 50% aqueous acetic acid at 95° C. but is insoluble in 40% or less aqueous acetic acid. Since a 23.2% solids polyvinyl acetate slurry when hydrolyzed in 40% acetic acid gives a product having a degree of hydrolysis equal to 67.4%, while with 30% acetic acid content the degree of hydrolysis rises to 76.6%, it can be seen that this acid limitation is of only minor importance. To obtain products having degrees of hydrolysis lower than 67.4% it is only necessary to employ a higher initial concentration of polyvinyl acetate in the slurry. By lower aliphatic carboxylic acid is meant a carboxylic acid having from one to eight carbon atoms.

It is realized, of course, that the maximum degree of hydrolysis obtainable by the method of the invention is of necessity lower than that which can be obtained without the addition of the organic acid, but since 95% hydrolysis is readily achieved by the heterogeneous process as described in the co-pending application of Goebel, Serial No. 742,466, partially hydrolyzed products of polyvinyl esters having many various degrees of hydrolysis less than 95% may be prepared by this invention. An 88% hydrolyzed polyvinyl ester corresponds to a commercial grade of polyvinyl alcohol now being produced and used in large quantities.

The correct proportion of organic acid to be added may be determined from a curve plotted for a specific polyvinyl acetate concentration in the slurry. A series of runs were initially made wherein the concentration of the organic acid in water at start of the reaction was known. After equilibrium was reached, the organic acid concentration was measured. The acid catalyst was then neutralized and the excess carboxylic acid recovered by steam distillation. The product was isolated by precipitation with methanol, washed and dried. A weighed quantity of the product was dissolved in water and warmed for four hours with standard sodium hydroxide solution to complete saponification. The excess base was then titrated with standard acid and the degree of hydrolysis calculated. Knowing the degree of hydrolysis and the initial concentration of the organic acid, a curve was plotted for a particular polyvinyl acetate concentration as shown in Figure 1. This curve, of course, is for one specific set of conditions, namely where the slurry contains 23.2% polyvinyl acetate. Once such curves are available, it is possible to predetermine the degree of hydrolysis, which will be obtained in any subsequent reaction, from the initial concentration of the aqueous acetic acid.

It is not necessary that the correct proportion of organic acid be added at the start of the hydrolysis since the same result is forthcoming if the addition takes place any time prior to the attainment of the desired degree of hydrolysis. Once the organic acid is added, the reaction apparently stops (actually an equilibrium is reached) at the desired point without the aid of any external factors.

The following examples, wherein parts are by weight, are given by way of illustration of the invention and are not to be considered as limitative.

Example I

To a solution of 85.9 parts of water, 1.0 part (0.7%) of sulfuric acid, 0.23 part (0.2%) of Nacconol NRSF (sodium dodecyl benzene sulfonate), and 19.1 parts (13.4%) of acetic acid, there was added 36.8 parts of polyvinyl acetate in bead form. Concentration of polyvinyl acetate in the slurry was 25.7%. After stirring the initially heterogeneous reaction mixture at a temperature of 100–105° C. for a period of 12 hours, the mineral acid and the catalyst were neutralized, the excess acetic acid removed by steam distillation and the partially hydrolyzed polyvinyl acetate was isolated by precipitation with methanol. This experiment was repeated twice to give products having an average degree of hydrolysis of 89.4%, the individual values being 89.1, 89.4, and 89.6%. In other words, the polyvinyl alcohols produced contained 10.9, 10.6, and 10.4 mole per cent of vinyl acetate respectively.

Example II

A second series of hydrolysis reactions were carried out as described in Example I with the exception that the acetic acid concentration was increased from 13.4% to 16.3% (calculated on the total weight of the charge). The slurry containing 25.7% (36.8 parts) polyvinyl acetate solids also included 81.7 parts of water, 1 part of sulfuric acid, 0.23 part of Nacconol NRSF and 23.3 parts of acetic acid. The products were found on analysis to be 88.5%, 88.0% and 88.1% hydrolyzed.

Example III

Proceeding in a manner similar to that described in Example I but without the addition of acetic acid, an aqueous slurry of high-viscosity polyvinyl acetate equal to 46% of the total weight of the original charge was hydrolyzed to give an 88% hydrolyzed product, the final hydrolysis solution containing 28.2% acetic acid and having a viscosity of 4000 poises at 100° C. The resulting polyvinyl alcohol, which was composed on the average of 88 mole per cent vinyl alcohol and 12 mole per cent vinyl acetate, had a viscosity of 45 centipoises when measured in 4% aqueous solution at 20° C. Obviously uniform processing of such high viscosity solution is impracticable but by lowering the original concentration of the polyvinyl acetate in the aqueous slurry to 25.7% and adding acetic acid in an amount 12.4% of the total weight of the charge, an 88% hydrolyzed polymer was produced in a solution having a viscosity of about 10–15 poises at 100° C.

It can be seen from the above examples that the addition of acetic acid in the correct proportion not only defines the desired degree of hydrolysis but assists in reducing the viscosity of the resulting solution of the partially hydrolyzed polyvinyl acetate to a value convenient for subsequent processing of the solution. Since viscosity mounts rapidly with solids content, the addition of acetic acid becomes increasingly valuable from the standpoint of convenient commercial operation as solutions of lower degrees of hydrolysis are required. The final viscosity of the solution of the hydrolyzed polymer is dependent, of course, on the solids concentration of the original charge of polyvinyl acetate.

In the absence of added acetic acid a decrease in the polyvinyl acetate concentration of the hydrolysis reaction causes an increase in the degree of hydrolysis. Likewise, an increase in the polyvinyl acetate concentration causes a decrease in the degree of hydrolysis provided there is no external addition of acetic acid. Knowing only the solids concentration of the starting material, it is, therefore, possible after receipt of experimental data from several hydrolysis reactions and plotting the information in the manner already described to predetermine the degree of hydrolysis which will be obtained in any subsequent reaction. It is impossible in this case to predict the degree of hydrolysis from purely theoretical considerations, such as the equilibrium constant, since polymeric solutions do not behave ideally. The degree of hydrolysis, of course, upon the addition of acetic acid to the hydrolysis mixture varies inversely with the concentration of the acetic acid provided the solids concentration remains constant. Actually the degree of hydrolysis is a function of the total acetic acid which includes that which is produced by the hydrolysis as well as that added initially.

Although the time required to bring the hydrolysis to the desired stage is a function of catalyst concentration, pressure, and temperature, none of these factors influence the actual degree of hydrolysis. For example, if polyvinyl acetate, such as described in Example I, is hydrolyzed at 15 lbs. per square inch gauge pressure, the desired degree of hydrolysis is reached in four hours instead of in twelve hours but the degree of hydrolysis is the same. In general, the reaction time is between four and forty hours, although longer or shorter times can be used.

In the controlled heterogeneous, acidic hydrolysis of water-insoluble polyvinyl esters by the process of this invention, it is necessary that the catalyst used be appreciably soluble in the polymeric esters subjected to hydrolysis and sufficiently acidic to promote the desired hydrolysis.

Such acidic catalysts are fully described in copending applications of M. T. Goebel, Serial No. 742,466, and R. C. Blume, Serial No. 772,457. The catalysts include, among others, octadecane sulfonic acid, benzene sulfonic acid, decyl benzene phosphinic acid, decyl benzene phosphonic acid, monoisoamyl phosphoric acid ester, monobutyl phosphoric acid, other alkyl phosphoric acids, etc. It is understood that the catalyst may be added either as the free acid or as a salt thereof, provided, of course, the salt derivative is readily convertible to the active acid in the presence of at least an equivalent quantity of mineral acid. Nacconol NRSF (sodium dodecyl benzene sulfonate) in the presence of a small amount of sulfuric acid may be employed advantageously. The sulfuric acid not only serves to liberate the free sulfonic acid, but increases the concentration of the catalyst within the solid particles of the polymer being hydrolyzed.

The amount of acid catalyst is not critical as satisfactory hydrolysis proceeds under the process of this invention with a concentration of as little as 0.025% of Nacconol NRSF. Concentrations preferred are in the range of 0.1%–2.0% (based on total weight of the charge) of the catalyst either in the acid or salt form. Larger amounts may be employed. However, since the reaction is catalytic, advantage of the effectiveness of small amounts is usually taken.

Likewise, the temperature is not critical. In most cases the hydrolysis of polyvinyl acetate in the presence of sulfuric acid and commercial sodium dodecyl benzene sulfonate is carried out at 90° C.–105° C. This range is preferred for in most cases rapid hydrolysis is obtained at these temperature levels without injurious effect on the polymer. Lower temperatures, such as 0° C.–90° C., may be employed, however, if desired. On the other hand, the rate of hydrolysis may be increased by employing higher temperatures, such as 100° C.–150° C., obtainable by well known methods. However, relatively complicated apparatus is required at these temperatures and the risk of degrading the various polymers is substantial. For most purposes the temperature range of 90° C.–105° C. is satisfactory.

While the invention has been described with particular reference to the hydrolysis of polyvinyl acetate, other polyvinyl esters may be advantageously hydrolyzed by the process of this invention. For example, polyvinyl formate, polyvinyl propionate, and polyvinyl butyrate as well as interpolymers and mixed polymers of polyvinyl esters with each other or with other polymerizable compounds, such as the interpolymers of vinyl esters and ethylene, specifically ethylene/vinyl acetate polymers, vinyl esters and vinyl halide, vinyl esters and fatty oils, etc., are also hydrolyzable by means of this invention.

Although in the foregoing examples the invention has been described in its preferred form of adding to the hydrolysis mixture the same organic acid as that which is produced by the hydrolysis, such need not necessarily be the case. However, in the event that a different organic acid is employed, a partially hydrolyzed mixed ester results. For example, in the partial hydrolysis of polyvinyl acetate, propionic acid may be added in equivalent molar amounts in place of acetic acid to control the degree of hydrolysis, but the resulting product is a hydrolyzed polyvinyl acetopropionate. The organic acid to be used is, preferably, a lower aliphatic carboxylic acid. Suitable carboxylic acids include formic, acetic, propionic, n-butyric, isobutyric, chloroacetic, n-valeric, n-caproic, n-heptoic and caprylic acids.

The present invention offers a means of obtaining in a simple and efficacious manner partially hydrolyzed polyvinyl esters having various degrees of hydrolysis. The extent of hydrolysis is accurately controlled in each instance. Since the properties of these products vary considerably in accordance with the proportion of hydroxyl groups that are present, it is important to be able to control precisely and reproducibly the extent of hydrolysis as is possible in the present process. The process of this invention may also be used in correcting "off specification" material, either to increase or decrease the degree of hydrolysis of such material.

The present invention also provides a number of technical advantages which are of importance in the manufacture of polyvinyl alcohol. Thus, the conversion of the raw materials into the final product may be carried out in one working step and in one apparatus. Moreover, it is not necessary in the process of this invention to prepare special emulsions nor to recover solvents to make the process economically feasible. No solvent need be used in the process of this invention and recovery steps are limited to the reclaiming of the organic acid added and freed from the polymeric vinyl ester in the hydrolysis. The efficiency of the catalyst permits its use in small inexpensive amounts and enables the desired degree of hydrolysis to be reached in relatively short periods of time.

The products of this invention may be used to manufacture films and fibers and, in general, wherever partially hydrolyzed polyvinyl esters, for example partially hydrolyzed polyvinyl acetate, find application. Partially hydrolyzed grades of polyvinyl acetate are especially desirable for sizing or impregnating fibrous materials and, in particular, textile yarns or other textile materials where a size is required which is capable of ready removal by washing or scouring in aqueous liquid.

I claim:

1. A process for the production of a low viscosity, partial hydrolysis product of a water-insoluble carboxylic acid ester of polyvinyl alcohol, said partial hydrolysis being no more than about 90% of theoretical, which comprises heating and stirring until equilibrium is established, a heterogeneous aqueous dispersion containing of from about 23.2% to about 25.7% of said ester and a lower alkyl carboxylic acid containing no more than 9 carbon atoms, which constitutes, at the lower concentration of ester, at least about 20% of the aqueous dispersion, and at the higher concentration of ester, at least about 12.4% of the aqueous dispersion and from about 0.1% to about 2.0% of a catalyst from the group consisting of sulfonic, phosphinic and phosphonic acids containing at least 5 carbon atoms, and the mono- and dialkyl orthophosphoric acid esters, the alkyl groups of which have from three to ten carbon atoms.

2. The process of claim 1 wherein the polyvinyl ester is polyvinylacetate, the lower alkyl carboxylic acid is acetic acid and the catalyst is the sulfonic acid defined.

3. A process for the production of a low viscosity, partial hydrolysis product of polyvinylacetate which comprises heating and stirring until equilibrium is established, a heterogeneous aqueous dispersion containing about 23.2% of said ester and from about 20% to about 40% of acetic acid and as a catalyst about 0.2% of sodium dodecyl benzene sulfonate and about 0.7% sulfuric acid.

4. A process for the production of a low viscosity, partial hydrolysis product of polyvinylacetate which comprises heating and stirring until equilibrium is established, a heterogeneous aqueous dispersion containing about 25.7% of said ester and from about 12.4% to about 16.3% of acetic acid and as a catalyst about 0.2% of sodium dodecyl benzene sulfonate and about 0.7% sulfuric acid.

5. The process of claim 3 wherein the mixture is stirred between the temperature of 100–105° C. for about twelve hours.

RICHARD WILSON NEBEL.

References Cited in the file of this patent

UNITED STATES PATENTS

| Number | Name | Date |
|---|---|---|
| 2,037,012 | Dreyfus | Apr. 14, 1936 |
| 2,457,261 | Morrison et al. | Dec. 28, 1948 |

FOREIGN PATENTS

| Number | Country | Date |
|---|---|---|
| 528,741 | Germany | July 15, 1931 |